United States Patent [19]

Jerry et al.

[11] Patent Number: 4,589,295
[45] Date of Patent: May 20, 1986

[54] EIGHT SPEED DROP BOX TRANSMISSION

[75] Inventors: James H. Jerry; Garry J. VanderEyk, both of Goderich, Canada

[73] Assignee: Champion Road Machinery Limited, Goderich, Canada

[21] Appl. No.: 575,279

[22] Filed: Jan. 30, 1984

[51] Int. Cl.$^4$ .............................................. F16H 3/08
[52] U.S. Cl. ......................................... 74/360; 74/331; 74/333
[58] Field of Search ................. 74/360, 359, 357, 331, 74/333

[56] References Cited

U.S. PATENT DOCUMENTS

| | | | |
|---|---|---|---|
| 2,804,780 | 9/1957 | Gerst | 74/360 |
| 2,953,942 | 9/1960 | Schwartz et al. | 74/360 X |
| 2,958,231 | 11/1960 | Gerst | 74/360 |
| 2,972,901 | 2/1961 | Gerst | 74/360 |
| 3,181,385 | 5/1965 | Siler | 74/360 X |
| 3,248,971 | 5/1966 | Lee et al. | 74/360 X |
| 3,344,679 | 10/1967 | Zeller | 74/360 |

FOREIGN PATENT DOCUMENTS 221770  5/1959  Australia ................. 74/360

OTHER PUBLICATIONS

TD-122-1402, "Powershift Transmission for Four Wheel Drive Farm Tractors", Twin Disc, Inc., Feb. 1980.

*Primary Examiner*—George H. Krizmanich
*Assistant Examiner*—Dirk Wright

[57] ABSTRACT

A drop box transmission suitable for drawbar pull vehicles or vehicles adapted to push obstacles or non-powered equipment and of a simplified construction. The transmission provides 8 different forward speeds and is easily adapted to provide either 4 or 8 reverse speeds. In one embodiment 8 forward speeds, 4 reverse speeds and full power shift capability is provided using of 14 gears, 5 shafts and 7 clutches. The reverse shaft is in constant mesh with the input shaft and includes at least one clutch controlled gear for driving the first intermediate shaft. Two clutched controlled gears are provided on the input shaft and are disengaged in the reverse mode. The output shaft having two clutch controlled gears is driven by a secondary intermediate shaft having at least 3 fixed gears thereon. In the case of only 3 gears on the secondary shaft one of the gears is in mesh with a clutch controlled gear on the first intermediate shaft and a clutch controlled gear on the output shaft.

24 Claims, 5 Drawing Figures

EIGHT SPEED DROP BOX TRANSMISSION

FIELD OF THE INVENTION

The present invention relates to drop box transmissions for use in construction, forestry and agricultural equipment. In particular the invention is directed to a simple drop box transmission.

Drop box transmissions are commonly used for interconnecting the output of an engine with the final drive of a vehicle for driving the wheels thereof. Vehicles presently using this type of transmission are used in the construction industry, the agricultural industry and the forestry industry and include motor graders, timber skidders, bull dozers and tractors. This type of transmission is of benefit in that it accomplishes a height transition between the drive from the engine and the drive arrangement for the axle while simultaneously providing a transmission for varying the resulting speed of the wheels relative to the engine speed. The transmission itself is a major component of the drive arrangement and therefore it is desirable to minimize the torque requirements of the transmission. The decrease in torque requirements is accomplished by a final drive arrangement which provides a further speed reduction adjacent the wheels.

Drop box transmission drive arrangements for this type of equipment are known, however generally they include fairly complicated arrangements having at least 6 shafts and more than 16 gears and include somewhat complicated arrangements requiring the use of expensive bearings to assure the reliability of the shafts. The cost of a transmission increases as a function of the number of gears, the number of shafts and the number of clutches and therefore it is desirable to produce a transmission having as few shafts and as few gears as possible while still providing a transmission satisfying the necessary speed requirements as well as providing a generally equal step increase between the various speeds.

Generally 8 forward speeds are required with the first three speeds providing a substantial reduction between engine speed and drive speed. It is also desirable that the final speed provide an overdrive arrangement wherein the output shaft will be faster than the input shaft in at least the upper most gear. Such an overdrive arrangement generally reduces the torque requirements of the transmission components. Furthermore it has generally been the practice to provide a transmission having an approximate 10 to 1 overall speed ratio.

In order to provide flexibility, a reverse shaft is provided which generally includes 1 clutch and an associated gear for allowing 4 reverse speeds. Therefore generally machinery of this type should have 8 forward speeds and at least 4 reverse speeds. In some cases it is desirable to have 8 forward and 8 reverse speeds and generally this has required the use of a completely different transmission. According to the present invention the ability to provide either 4 or 8 reverse speeds can be accomplished easily.

This application is generally directed to power shift transmissions which in the past have been of a complicated design to provide the required 8 forward speeds and at least 4 reverse speeds. Also the prior art has usually required more costly bearing support arrangements, sometimes intermediate the shaft lengths, in order to reduce shaft deflection. Such bearing arrangements are expensive and significantly increase the cost and difficulty in manufacturing the transmission.

Other manufacturers of this type of vehicle have proposed the use of a straight drop box gearing arrangement to provide the required transition in height between the engine output and the drive of the axle in combination with a further planetary gear system for varying the speed of the shafts. These arrangements work satisfactory however generally require fairly large volumes in order to economically produce the transmission.

The proposed drop box transmission simplifies the drive arrangement and utilizes the various gears of the transmission to accomplish the required height transition. In particular, orientation of the various shafts and the co-operation between the gears results in a simplified transmission which can be manufactured inexpensively while also providing fairly short shaft lengths which are not prone to deflection. Deflection of the shafts is further reduced by positioning the gears adjacent the ends of the shafts which are supporting in the casing with the clutch packs intermediate the gears.

SUMMARY OF THE INVENTION

A drop box transmission according to the present invention comprises a casing, and input shaft and an output shaft spaced the appropriate distance for the desired drop, the input shaft and the output shaft being selectively interconnected by a plurality of gears at least some of which are controlled by clutches. The input shaft carries a high imput gear and associated clutch and a low input gear and associated clutch with these gears in mesh with further gears fixed on a first intermediate shaft. The first intermediate shaft also supports the first intermediate shaft high and low gears each having an associated clutch. A second intermediate shaft is located between the first intermediate shaft and the output shaft and carries at least three gears fixed thereon with two of these gears in mesh with the high and low gears of the first intermediate shaft. Two of the at least three gears fixed on the second intermediate shaft are in mesh with the high and low gears on the output shaft such that at least one of these two gears only meshes with the output shaft high or low gear. The high and low gears of said output shaft is controlled by an associated clutch. The selective activation of three of the clutches provides eight different combinations of gears for driving the output shaft at various speeds relative to the input shaft.

Preferrably the gears are selected to provide a maximum ratio of about ten to one and to provide a generally equal step increase in speed between different combinations of gears of about 40%. Furthermore the clutches are so positioned such that the 8 speeds are accomplished by selectively activating clutch.

According to a preferred aspect of the invention the eight speeds are accomplished with only four shafts, eleven gears and six clutches.

According to a further aspect of the drop box transmission a reverse shaft is included which includes a gear splined on and in mesh with, a further gear splined on the input shaft. The reverse shaft carries a clutch and a further gear in mesh with one of the splined gears on said first intermediate shaft to thereby provide four reverse speeds by selective engagement of reverse clutch and release of said clutches on said input shaft and selective engagement of one of said clutches on said first intermediate shaft and one of said clutches on the output shaft.

According to yet a further aspect of the invention all clutches are pneumatic clutch packs thereby providing a full power shift eight speed transmission.

BRIEF DESCRIPTION OF THE DRAWINGS

Preferred embodiments of the invention are shown in the drawings wherein.

DETAILED DESCRIPTION OF THE PREFERRED EMBODIMENTS

Figure 1:
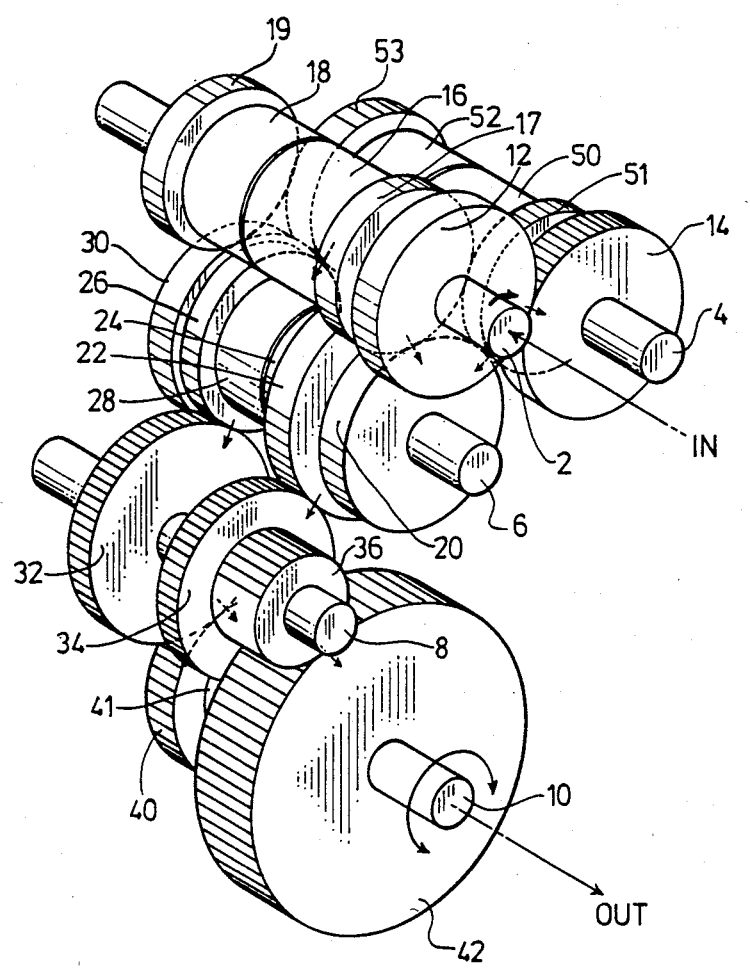
FIG. 1 is a perspective view illustrating the various shafts and associated gears of the transmission.

The transmission as diagramatically shown in FIG. 1, has an input shaft 2 which includes a fixed gear 12 splined thereon and in mesh with a further fixed gear 14 splined on reverse shaft 4. This causes the reverse shaft 4 to continually rotate with rotation of the input shaft 2. Secured on the input shaft 2, for selectively driving gears 20 and 30 provided on the first intermediate shaft 6, are two power actuated clutches 16 and 18 and a high input gear 19 and a low input gear 17. The low input gear 17 will essentially free wheel on the input shaft when the power actuated clutch 16 is disengaged and similarly the high input gear 19 will free wheel when the power actuated clutch 18 is disengaged. These particular clutches are of a single acting piston type and therefore actuation of one clutch results in the other clutch being disengaged. This type of clutch is also used on the reverse shaft 4, the first intermediate shaft 6 as well as the output shaft 10 and acts as a safety feature as it reduces the possibility of the transmission locking known as 4 squared. The first intermediate shaft 6 carries four separate gears including the fixed gear 20 in mesh with the low output gear 17 of the input shaft 2, a high first intermediate gear 22 controlled by power actuated clutch 24, a low first intermediate gear 26 controlled by power actuated clutch 28 and a fixed gear 30 in mesh with the gear 19 on the input shaft for driving the first intermediate shaft 6 when clutch 18 is engaged.

Three gears are located on the second intermediate shaft 8, all of which are fixed as they are directly splined to the shaft. Fixed gear 32 is in mesh with gear 26 of the first intermediate shaft 6 and is also in mesh with the high gear 40 of the output shaft 10 which is clutch actuated. Gear 32 during operation of the transmission can act as a driven gear, a drive gear or as an idler gear. Gear 34 is in mesh with gear 22 on the first intermediate shaft 6 and a gear 36 is provided on the second intermediate shaft 8 to mesh with the low output gear 42.

Figure 5:
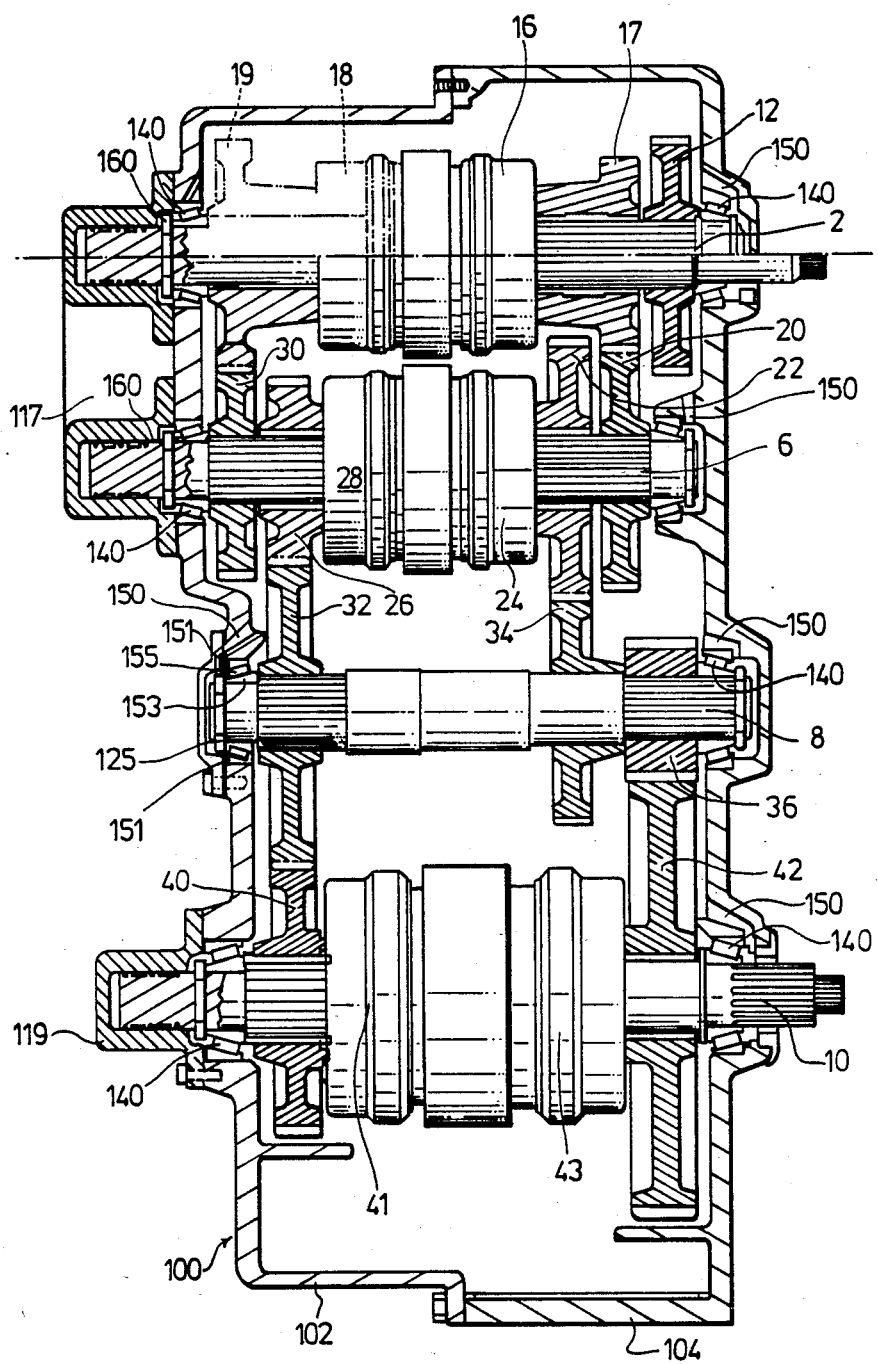
FIG. 5 is a diagrammatic view with the shafts spaced in the length of the transmission to more clearly illustrate the meshing of the various gears, the reverse shaft is not shown.

As shown in FIG. 5, the high gear 40 and the low gear 42 are each controlled by power actuated clutches, namely clutches 41 and 43 respectively. By selective activation of power clutches 16, 18, 24, 28, 41 and 43, eight different forward speeds can be achieved when the reverse clutches are disengaged. Similarly, eight different reverse speeds can be obtained by disengaging clutches 16 and 18 and selectively activating one of the reverse clutches 50 and 52. This will produce a reverse rotation of the first intermediate shaft, the second intermediate shaft and the output shaft. This is accomplished as a low reverse 51 gear is associated with clutch 50 and a high reverse gear 53 is associated with clutch 52. Gear 51 meshes with gear 20 of the first intermediate shaft and gear 53 meshes with gear 30 on the first intermediate shaft. The reverse shaft essential functions as the input shaft for the transmission when clutches 16 and 18 are disengaged and has an opposite rotation due to gear 12 on the input shaft 2 meshing with gear 51 on the reverse shaft 4.

As shown in FIG. 5, the various gears of the transmission are located adjacent the sidewalls of the casing and provide better support as the forces exerted on the gears are loaded on the shafts adjacent the transmission casing. The shafts when loaded undergo deflection and it is preferrable to locate the gears adjacent the supported portion of the shaft to reduce the extent of the deflection. For this reason the various power actuated clutches have been centrally located with the gears on the shaft located exterior thereto.

The term drop box transmission refers to the relative position of the input shaft 2 to the output shaft 10. As can be seen, a vertical spacing has been provided between these two shafts 2 and 10 and the various gears located between the shafts provide the various forward and reverse speeds. Therefore the transmission not only acts to change speed, but also serves to provide a gear train to drive an output shaft 10 located below the input shaft 2.

This transmission provides 8 speeds with relatively few gears. The eight forward speeds are accomplished with four shafts 2, 6, 8 and 10 which carry 11 gears and 6 different clutches. In order to provide an 8 forward speed and four reverse speed transmission, 14 gears, 5 shafts and 7 clutches are required. These gears are preferrably helical gears with the exception of gear 36 and gear 42. Because helical gears are used, the bearings for supporting the shafts must be capable of accepting thrust and it should be noted that the simple tapered roller bearings are provided which are less expensive than more sophisticated roller bearings commonly used. The present transmission can use these simple bearings due to the particular arrangement of the shafts and locations of the gears and the shafts are only supported adjacent their ends by bearings located in the sidewalls of the transmission casing generally designated 100.

In addition to the reduced number of gears and shafts and the simplicity of mounting of the shafts between the two halves 102 and 104 of the transmission casing 100, this transmission when used in association with a motor grader having power in the range of about 100 to 250 horse power can provide a working speed in the range of about 1 to 6 miles per hour with a top speed of approximately 25 miles per hour. The sizing of the teeth and the relationship of the various gears is such that at least one of the upper gears is an overdrive gear and wherein the ratio of spread (speed of output shaft in high gear to speed of output shaft in 1st gear for a given engine speed) is about 10 to 1. Such a transmission is advantageous for construction, forestry and agricultural machinery. In addition, the reverse gear is driven at the same speed as the input shaft, according to the preferred embodiment, and this results in at least two reverse working speeds within the above range with two additional gears near the upper portion of the range. It can be appreciated that if only one clutch gear is associated with the reverse shaft 4, only four speeds will be obtained and preferrably these will be speeds corresponding to forward speeds 1, 3, 5 and 7. If preferred, the gear 53 and clutch 52, could be provided in place of gear 51 and clutch 50 and this will result in reverse speeds generally corresponding to forward speeds 2, 4, 6 and 8.

By providing both clutches 50 and 52 and gears 51 and 53, 8 reverse speeds are provided. Therefore the design of this particular transmission allows either a 4 speed reverse or an 8 speed reverse transmission merely by the addition of an additional clutch on the reverse shaft and one additional gear in mesh with a gear on the first intermediate shaft. Therefore the present design allows flexibility with the number of reverse speeds that can be provided.

Similarly it is possible to vary the forward speeds by eliminating clutch 18 and gear 19 and/or clutch 16 and gear 17. This would be advantageous when a particular direction of rotation of the output shaft relative to the input shaft is required. Thus the reverse shaft could be used to provide the 8 forward speeds and the input shaft used to provide the reverse rotation of the output shaft.

Also FIG. 5 illustrates how the shafts can be ported to provide flow of hydraulic fluid through the shafts to the various power clutches for controlling the clutches. This reduces the complexity of the hydraulic system and assures better distribution of the hydraulic fluid. Some leakage of hydraulic fluid is allowed adjacent the ends of the particular ported shafts to provide bearing lubrication.

Figure 3:
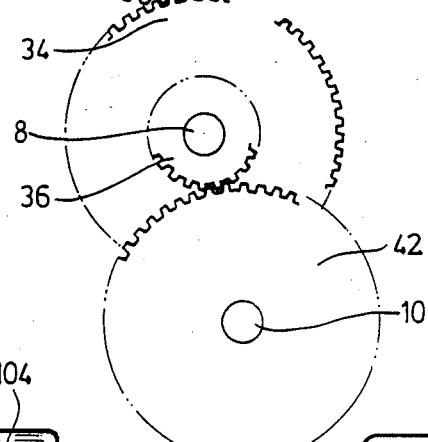
FIG. 3 is a side view showing the casing and the hydraulic controls used to control the power actuated clutches.
Figure 3:
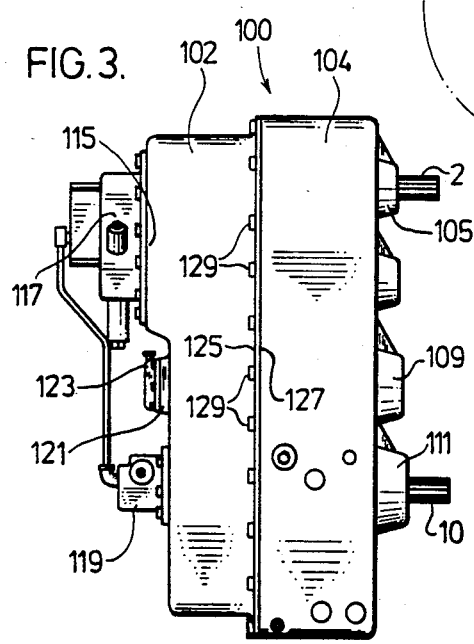
Figure 4:
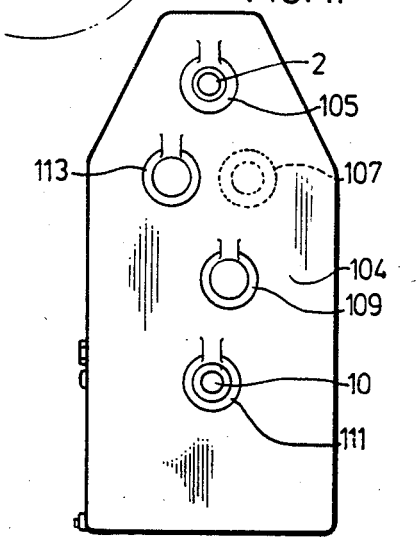
FIG. 4 is an end view showing the input and output shafts.

The transmission casing 100 is best shown in FIGS. 3, 4 and 5. The casing is cast as two separate halves 102 and 104 and vertically split. Casting 104 includes 4 exterior bosses 105 for the input shaft 2, 113 for the reverse shaft 4, 109 for the second intermediate shaft 8 and 111 for the output shaft 10. Interior to casting 104 a boss 113 has been provided for the first intermediate shaft 6. These bosses are machined to receive the tapered bearings 104 supporting the ends of the shafts. Bosses 105 and 111 are drilled to allow shafts 2 and 10 to pass therethrough.

Casting 102 includes a stepped out area 115 for accomodating and supporting the input shaft 2, the first intermediate shaft 6 and the reverse shaft 4, all of which extend through casting 102. A hydraulic control cap 117 is secured to casting 102 and distributes hydraulic fluid to the ends of the shafts which are ported and connected to the clutch packs for activation thereof. A further hydraulic cap 119 is provided for output shaft 10 which also extends through casting 102. The second intermediate shaft does not require hydraulic control and is supported by boss 121 having a cover plate 123. Adjustment on the end play of shaft 8 is accomplished by selecting shim packs 151 shown in FIG. 5. Nut 125 acts against the tapered roller bear raceway 153 secured on the shaft to maintain it in position. The tapered roller is 155. Similar arrangements are used on the ends of the shafts supported in casting 102. Casting 102 and 104 have abutting machined flanges 125 and 127 secured by bolts 129.

By providing hydraulically actuated clutch packs such as those manufactured by Rockford, division of Borg Wagner, or pneumatic or electric clutches, a full power shift transmission is provided. The following chart specifies the actuation of clutches for the 8 different forward speeds.

| Forward Speed | Step (% change in speeds between adjacent speeds) | Clutches Engaged | Clutches Disengaged | Ratio |
| --- | --- | --- | --- | --- |
| 1 | 40 | 16, 28, 43 | 18, 24, 41 | 7.3 |
| 2 | 39 | 18, 28, 43 | 16, 24, 41 | 5.2 |
| 3 | 40 | 16, 24, 43 | 18, 28, 41 | 3.8 |
| 4 | 41 | 18, 24, 43 | 16, 28, 41 | 2.7 |
| 5 | 40 | 16, 28, 41 | 18, 24, 43 | 1.9 |
| 6 | 39 | 18, 28, 41 | 16, 24, 43 | 1.4 |
| 7 | 40 | 16, 24, 41 | 18, 28, 43 | 1.0 |
| 8 |  | 18, 24, 41 | 16, 28, 43 | .7 |

The gears used to provide the above forward speeds and ratios have the following number of teeth;

| Gear | Gear Teeth |
| --- | --- |
| 17 | 42 |
| 19 | 50 |
| 20 | 54 |
| 22 | 59 |
| 26 | 41 |
| 30 | 46 |
| 32 | 70 |
| 34 | 52 |
| 36 | 24 |
| 40 | 61 |
| 42 | 80 |

For reverse, the fixed gears 12 and 14 have the same number of teeth, and gear 51 has 42 teeth and gear 53 has 50 teeth.

As can be seen from the above charts, a constant step of approximately 40% is provided between the various speeds and this has proven quite satisfactory with respect to the torque and power characteristics of engines used in these applications. Typically the engines have a horse power less than about 250 horsepower although the transmission layout and power flow is not restricted by horsepower. This arrangement further assures differential clutch plate speeds remain within acceptable limits, when clutches are disengaged and gears rotate due to back drive. This type of transmission is generally referred to as a geometric transmission due to the manner in which the gears cooperate to provide the various speeds.

Figure 2:
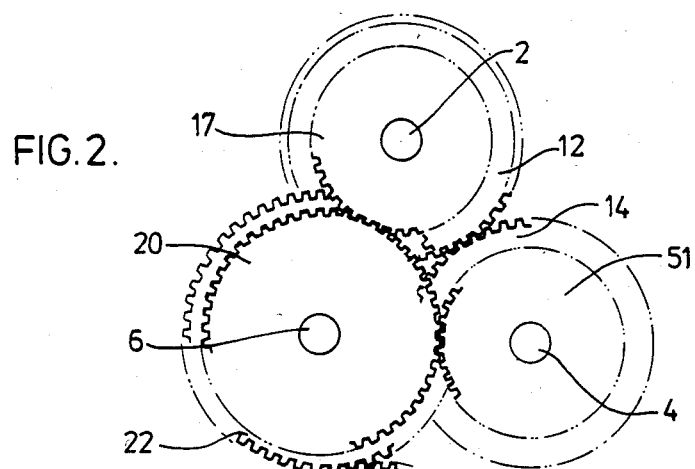
FIG. 2 is a partial end view showing the position of the various shafts and gears to the right side of the transmission.

As generally shown in FIG. 2 of the drawings, a different layout of the shafts is provided. This layout is suitable for the casing shown in FIGS. 3, 4 and 5. Three shafts, 6, 8 and 10, have been positioned generally in line with shafts 2 and 4 offset to one side. The actual drop between the input shaft 2 and the output shaft 10 can be varied by the position of the second intermediate shaft 8 relative to the output shaft 10 and the first intermediate shaft 6. Therefore this arrangement also provides flexibility with respect to the amount of drop between the input shaft and the output shaft. Similarly the input shaft, the reverse shaft and the first intermediate shaft may be adjusted as a unit to suit the particular requirement.

The reduction in gears is accomplished due to the particular relationship of the shafts and gears carried thereon, however the reduction at least partially relies on the aspect that gear 32 can be a driven gear when driven by gear 26 and with clutch 41 disengaged, can be an idler gear when driven by gear 26 and clutch 41 engaged, or can be a drive gear when the second intermediate shaft is driven by gear 34 and clutch 28 is disengaged and clutch 41 is engaged. Therefore gear 32 has multiple usages and reduces the number of gears in the transmission.

In addition to the overall design which supports the gears on the shafts adjacent the transmission casing with the clutches interior to the gears, the shafts are short in length further reducing deflection. Catch basins are also provided at positions 150 above some of the bearings of the individual shafts within the cast sides of the transmission housing and these catch basins direct oil to the bearings. The hydraulic fluid used to control the power actuated clutches provides lubrication for the bearings adjacent the one end of the shaft at positions generally designated as 160.

In the full power shift structure the clutches allow selective engagement of one shaft to a second shaft via at least one combination of a clutch and two gears, with one gear driven by the clutch. The clutch can be carried by either shaft as it merely serves to allow one of the gears to free wheel on one of the shafts. It is also possible to use manual clutches although this may present a rather awkward control arrangement. However, it would be relatively simple to provide a manual high low arrangement to mechanically clutch gears 40 and 42 while still providing the full power shift feature between speeds 1 through 4 and speeds 5 through 8. Such an arrangement would reduce the cost. Further cost reductions could be accomplished by using a manual clutch arrangement for the reverse shaft.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A drop box transmission comprising a casing, an input shaft and an output shaft said input shaft and said output shaft being selectively interconnected by a plurality of gears at least some of which are controlled by clutches, said input shaft carrying thereon a high gear and an associated clutch and a low gear and associated clutch, said high and low input gears each meshing with a further gear fixed on a first intermediate shaft, said first intermediate shaft also supporting first intermediate shaft high and low gears each having an associated clutch, a second intermediate shaft located between said first intermediate shaft and said output shaft carrying at least 3 fixed gears on said second intermediate shaft two of which are in mesh with said high and low gears of said first intermediate shaft and two of said at least 3 gears being in mesh with high and low gears on said output shaft with all said at least 3 gears being in mesh with at least one other gear, said high and low gears on said output shaft each being controlled by an associated clutch, said clutches by selective activation of three thereof providing 8 different combinations of gears for driving said output shaft at various speeds relative to said input shaft.

2. A drop box transmission as claimed in claim 1 wherein said 8 speeds are accomplished with only 4 shafts, 11 gears and 6 clutches and said second shaft carries 3 fixed gears only one of which is in mesh with gears on said first intermediate shaft and said output shaft.

3. A drop box transmission as claimed in claim 1 including an additional reverse shaft and a gear fixed thereon and in mesh with a further gear provided on said input shaft, said reverse shaft carrying a clutch and a further gear in mesh with one of the fixed gears on said first intermediate shaft to thereby provide 4 reverse speeds by
   (a) selective engagement of said reverse clutch,
   (b) release of said clutches on said input shaft,
   (c) selective engagement of one of said clutches on said first intermediate shaft, and
   (d) selective engagement of one of said clutches on the output shaft.

4. A drop box transmission as claimed in claim 3 wherein said reverse shaft carrys one additional gear and clutch, said additional gear being in mesh with one of said fixed gear on said first intermediate such that each clutched reverse gear is in a mesh with a different gear fixed on said first intermediate shaft, said two reverse gears by selective engagement of said clutches providing 8 reverse speeds.

5. A drop box transmission as claimed in claim 3 wherein said clutches are selected to provide a full power shift transmission.

6. A drop box transmission as claimed in claim 1 wherein at least 4 of said clutches are selected from the group consisting of hydraulic pneumatic and electric clutches, said clutches being disposed intermediate the lengths of said shafts with said gears located either side of said clutches.

7. A drop box transmission as claimed in claim 6 wherein all clutches are selected to provide a full power shift transmission.

8. A drop box transmission as claimed in claim 7 wherein said clutches are hydraulic and any pair of clutches on a shaft are operated by a common piston thereby assuring only 1 clutch per shaft is locked at a given time.

9. A drop box transmission as claimed in claim 2 wherein said second intermediate shaft carries only 3 gears one of which acts as;
   (a) a driven gear for driving said second intermediate shaft which drives said output shaft by means of a further gear on said second intermediate shaft
   (b) an idler gear between said first intermediate and said output shaft, and
   (c) acts as a drive gear for driving said output shaft.

10. A drop box transmission as claimed in claim 3 wherein all shafts are parallel and supported either side of said casing, said clutches are all supported centrally of the length of said shafts and said gears are positioned between said casing and said clutches to reduce shaft deflection.

11. A drop box transmission as claimed in claim 3 wherein said gears on said input shaft, said first intermediate shaft and two of said gears on said second intermediate shaft are helical gears.

12. A drop box transmission as claimed in claim 3 wherein said gears provide an overdrive in at least one combination thereof.

13. A drop box transmission as claimed in claim 8 wherein said clutches are hydraulic and controlled by hydraulic fluid associated with said shafts.

14. A drop box transmission as claimed in claim 1 wherein said shafts are supported in taper roller bearings secured in said housing, said housing adjacent said bearings including cored out areas to direct splashed oil to said bearings.

15. A drop box transmission as claimed in claim 3 wherein said further gear of said reverse shaft is in mesh with the low gear of said first intermediate shaft to provide 4 reverse speeds having a gear ratio corresponding to the first, third, fifth and seventh forward speeds.

16. A drop box transmission as claimed in claim 1 wherein said gears are selected to produce the following gear ratios for the 8 forward speeds

| Forward Speed | Gear Ratio |
| --- | --- |
| 1 | 7.3 |
| 2 | 5.2 |
| 3 | 3.8 |
| 4 | 2.7 |
| 5 | 1.9 |
| 6 | 1.4 |
| 7 | 1.0 |
| 8 | .7 |

17. A drop box transmission as claimed in claim 1 wherein said first intermediate shaft, said second intermediate shaft and said output shaft are generally aligned, and the remaining shafts are offset relative to said aligned shafts.

18. A drop box transmission as claimed in claim 3 wherein said reverse shaft is constantly driven at about the same speed as said input shaft but in the opposite direction.

19. A drop box transmission as claimed in claim 2 wherein said low gear on said output shaft is a spur gear which is continually in mesh with a spur gear on said second intermediate shaft.

20. A drop box transmission as claimed in claim 3 wherein said gears are of a size to provide a ratio of about 10 to 1 and to provide a generally equal step increase in speed between combinations of gears.

21. A drop box transmission as claimed in claim 1 wherein said shafts are supported by tapered roller bearings.

22. A drop box transmission comprising an input shaft, a first intermediate shaft, a second intermediate shaft and an output shaft, said input and output shafts being interconnected by gears such that said input shaft drives said first intermediate shaft which drives said second intermediate shaft which drives said output shaft for selectively driving said output shaft at various speeds relative to said input shaft, said input shaft carrying thereon a high gear meshing with a first driven gear on said first intermediate shaft and including first clutch means associated therewith for selectively driving said first intermediate shaft and said input shaft carrying thereon a low gear meshing with a second driven gear on said first intermediate shaft;

second clutch means associated therewith for selectively driving said first intermediate shaft; said first intermediate shaft also supporting first intermediate shaft high and low gears, said second intermediate shaft carrying at least 3 gears thereon two of which are in mesh with said high and low gears of said first intermediate shaft, at least two of said at least 3 gears being in mesh with high and low gears on said output shaft such that at least one of said two gears only meshes with a gear on said output shaft;

third clutch means associated with said high gear of said intermediate shaft and said gear on said second intermediate shaft in mesh therewith for selectively driving said second intermediate shaft;

fourth clutch means associated with said low gear of said intermediate shaft and said gear on said second intermediate shaft in mesh therewith for selectively driving said second intermediate shaft;

fifth clutch means associated with said high gear of said output shaft and said gear on said second intermediate shaft in mesh therewith for selectively driving said output shaft; and sixth clutch means associated with said low gear of said output shaft and said gear on said second intermediate shaft in mesh therewith for selectively driving said output shaft;

said clutch means by selective activation of three thereof providing 8 different combinations of gears for driving said output shaft at various speeds relative to said input shaft.

23. A drop box transmission as claimed in claim 22 wherein at least some said clutch means are selected from the group consisting of hydraulic pneumatic and electrically activated clutch packs.

24. A drop box transmission as claimed in claim 23 wherein said gears are of a size to provide a ratio of about 10 to 1 and to provide a generally equal step increase in speed between combinations of gears.

* * * * *